United States Patent [19]

Jellinek et al.

[11] 4,301,208

[45] Nov. 17, 1981

[54] METHOD FOR REDUCING THE ADHESION OF ICE TO THE WALLS OF NAVIGATION LOCKS

[75] Inventors: Hans H. G. Jellinek, Potsdam, N.Y.; Guenther E. Frankenstein, Lebanon; Ben Hanamoto, North Sutton, both of N.H.

[73] Assignee: The United States of America as represented by the Secretary of the Army, Washington, D.C.

[21] Appl. No.: 183,878

[22] Filed: Sep. 4, 1980

[51] Int. Cl.³ .................... B32B 27/36; B32B 9/04

[52] U.S. Cl. ................... 428/334; 428/339; 428/412; 428/447; 427/387; 427/393.6; 260/29.1 SB

[58] Field of Search ............... 260/29.1 SB; 427/387, 427/393.6; 428/412, 447, 334, 339

[56] References Cited

U.S. PATENT DOCUMENTS 3,308,079  3/1967  Haenni .................. 260/29.1 SB
3,751,519  8/1973  Bostick et al. ............ 260/29.1 X Primary Examiner—Michael R. Lusignan
Attorney, Agent, or Firm—Darrell E. Hollis

[57] ABSTRACT

A method of reducing adhesion of ice to a surface by coating it with a block copolymer of polycarbonate and dialkylsiloxane containing a silicone oil.

11 Claims, No Drawings

METHOD FOR REDUCING THE ADHESION OF ICE TO THE WALLS OF NAVIGATION LOCKS

BACKGROUND OF THE INVENTION

This invention relates to methods of treating surfaces exposed to icing conditions to reduce the bond strength of ice and facilitate its removal from such surfaces.

The accumulation of ice on structures exposed to icing conditions presents problems which may arise from the weight or thickness of the ice. Consequently, it is often necessary to remove ice from ice-coated surfaces. An ice layer may be removed by application of thermal energy to the interfacial bond or by mechanical methods. Thermal methods are slow, require large expenditures of energy, and may be ineffective in some areas, such as the northern portions of the United States where the winter temperatures are extremely low. Mechanical methods involving breaking the ice from structural surfaces are fast and energy-efficient; however, the high strength of adhesion of ice to many surfaces makes ice removal difficult. Furthermore, the strength of adhesion of ice to substrate surfaces such as concrete may exceed the strength of the substrate material and cause the substrate to break or spall.

Icing presents special problems in the lock system for navigating the Great Lakes where ice can build up in layers thick enough to prevent the passage of large vessels. Ice forms on the surfaces of lock walls by direct freezing of water as it comes into contact with the cold wall surface or by the adhesion of floating ice onto a cold wall. This latter process occurs primarily when a ship entering a lock pushes floating ice into the lock area.

The thickness and depth of the ice on the walls depend on factors such as weather, ice conditions outside the lock, traffic, water level, and lock operating procedures. In the Great Lakes area, ice build-up extending four feet into the water channel from the lock walls is not uncommon. This ice reduces the clearance between the walls and the sides of the entering vessels. When the clearance is low, an entering ship can push floating ice into the lock and become wedged while entering.

Since a significant build-up of ice will prevent large ships from passing through the locks, efficient operation of the locks requires that ice be removed. Several methods of removing ice from lock walls have been tested including: (1) use of high pressure (10,000 psi) water jets to cut the ice; (2) attachment of an inflatable boot to the wall which sheds the ice when expanded; (3) use of a saw to cut the ice; and (4) attachment of electrically conductive concrete panels to the lock wall. Ice was removed from the walls using these methods; however, all were time-consuming, and techniques to increase the efficiency of these or other methods have been sought.

One reason for the difficulty in removing ice is the high adhesion strength between the ice and the wall at ambient winter temperature and a reduction in this adhesion by use of a suitable ice release agent would facilitate ice removal.

Ice release agents should not only have low adhesive strength to ice, but also have good film integrity, high abrasion resistance and excellent substrate adhesion. The severe conditions encountered in removing ice from navigation lock surfaces require that the ice release agents be able to resist the forces encountered in removing the large amounts of ice, adhere to the highly porous and soiled concrete surfaces to be treated, and survive the many repetitions of the ice removal during the season. Further, a material is required which can be applied in relatively thick layers and be capable of being applied under adverse conditions, i.e., in the presence of moisture encountered from the seepage, rain, and operation of the lock.

SUMMARY OF THE INVENTION

It is, accordingly, one object of this invention to provide a method for reducing ice adhesion which can be used with navigation locks.

It is another object to provide a coating for surfaces subject to icing conditions which will be effective in reducing adhesion through many cycles.

It is still another object to provide a coating for reducing ice adhesion which will adhere well to vertical concrete surfaces which have been weathered.

It is yet another object to provide a coating which can be formed into relatively thick layers with several applications.

In accordance with this invention, a method is provided for reducing adhesion of ice to a surface comprising coating the surface with a co-polymer of a polycarbonate and dimethylsiloxane. In the preferred method, this co-polymer is mixed with silicon oil. Laboratory tests have shown that the preferred coating will reduce the ice adhesion by over 99%, and is effective through many ice formation and removal cycles. Tests showed that ice is readily removed from the walls of navigation locks which have been coated in accordance with this invention. Ice was more easily removed from a coated section not only by mechanical means but, unexpectedly, by thermal means.

DETAILED DESCRIPTION OF THE INVENTION

In carrying out this invention, the surface to be treated is coated with a composition comprising a block co-polymer of a polycarbonate and dimethylsiloxane. The polycarbonate may comprise about 34 to 36 percent by weight of the co-polymer, and is preferably about 35 percent by weight.

The dimethylsiloxane may comprise about 64 to about 66 percent by weight of the co-polymer and is preferably about 65 percent by weight. A dimethylsiloxane block chain length of 19 to 21 units is preferred and a chain length of 20 units is most preferred.

The polycarbonate portion is preferably an aromatic polycarbonate made from a dihydricphenol such as bisphenol A. The preferred polycarbonate is made by reacting bisphenol A with phosgene, as exemplified by the polycarbonate sold under the tradename Lexan. Typically, useful polycarbonates and block polymers with dimethylsiloxane made therefrom are discussed in U.S. Pat. No. 3,189,662 to Howard A. Vaughn, Jr. U.S. Pat. No. 3,832,419 to Will D. Merrite, Jr., and U.S. Pat. No. 3,751,519 to Edgar E. Bostick et al.

The preferred composition also contains a silicone oil. The silicone oil reduces the adhesion of ice below that of a pure block co-polymer, and is effective over many cycles since oil removed from the outer surface of the coating is replenished by diffusion from the bulk of the coating. The silicone oil may be present in the amount of about 9 to about 11 percent by weight of the block co-polymer, and is preferably present in the amount of about 10 percent by weight. The oil may be any silicone oil of technical grade quality (certified ACS grade) with a specific gravity of 0.963, e.g. A. H. Thomas & Co., No. 6407.

The composition is preferably applied to the surface to be treated by dissolving the co-polymer and the silicone oil, if present, in a solvent and spraying it onto the surface in several coats. The preferred solution is sufficiently viscous so that a thin layer, i.e., 0.10 to 0.13 mm can be built up onto a vertical surface with about 2 to 3 coats. A typically useful solvent is technical grade quality toluene.

The surface to be coated is preferably cleaned to remove loose particles and foreign material such as oil, dirt and organic growth. The coating should be thick enough to completely cover the substrate. If several ice formation and removal cycles will occur between coatings, the coat should be thicker than that required to merely cover the substrate. For ice encountered in the locks of the Great Lakes, a coating on concrete may suitably range from about 0.10 to about 0.13 millimeters.

The following examples are offered to illustrate the invention in more detail.

EXAMPLE I

Tests were carried out in the laboratory of the ability of coatings of block co-polymers of polycarbonate and dimethylsiloxane to reduce the adhesion of ice to surfaces. Aluminum test plates 7.5 cm×7.5 cm were cleaned with a detergent, rinsed in tap water, then rinsed in distilled water, and then dried at 85° C. The dried plates were rinsed with methylene chloride.

In order to provide a basis for comparison with coated plates, ice was formed on uncoated plates. This was done by placing 4.3 cm diameter aluminum cylinders on the plates, cooling to −10° C., pouring boiling distilled water into the cylinder, cooling to −10° C. and storing at −10° C. for 20 hours before testing. Each plate and cylinder combination was placed in test apparatus to measure the force required to separate the two. This was accomplished by clamping the cylinder in a vertical position and pulling the plate in a horizontal direction. The pull was measured by a strain gauge and the adhesive strength was calculated. The testing was carried out at −10° C. The mean adhesive strength for eight uncoated plates was 3.58 kg/cm$^2$.

EXAMPLE II

Plates coated with a block co-polymer of polycarbonate and dimethylsiloxane, with and without silicone oil, were tested in the same way as the uncoated plates of Example I. Repeated adhesion tests were made by drying each plate after each test and then refreezing an ice cylinder to it. The following table gives the results of those repeated tests.

| | Repeated Adhesion Tests Force Kg/cm$^2$ 10' | | | | | | |
|---|---|---|---|---|---|---|---|
| Sample | 1 | 2 | 3 | 4 | 5 | 6 | 7 |
| 1[a] | 0.52 | 0.42 | 0.38 | 0.78 | 0.39 | 0.68 | 0.33 |
| 2[b] | 0.42 | 0.41 | 0.76 | 0.50 | 0.40 | 0.50 | 0.50 |
| 3[d] | 0.22 | 0.54 | 0.64 | 0.60 | 0.40 | 0.33 | 0.43 |
| 4[b] | 0.53 | 0.63 | 0.41 | 0.51 | 0.62 | | |
| 5[c] | 0.45 | 0.43 | 0.36 | 0.50 | 0.37 | | |
| 6[c] | 0.43 | 0.58 | 0.45 | 0.53 | 0.45 | | |
| 7[c] | 0.64 | 0.52 | 0.30 | 0.36 | 0.51 | | |

[a] Polycarbonate alone.
[b] Block co-polymer of polycarbonate and dimethylsiloxane.
[c] Block co-polymer of polycarbonate and dimethylsiloxane plus 10% silicone oil.
[d] Block co-polymer of polycarbonate and dimethylsiloxane (LR 5630 mfg. by General Electric, Inc.) plus 10% silicone oil.

Additional testing indicated that Sample 3 is the most effective coating for reducing the adhesive strength of ice, and all further testing was carried out with this compound.

EXAMPLE III

Four aluminum plates coated with a block co-polymer of polycarbonate and dimethylsiloxane and containing 10% silicone oil, as in Sample 3 of Example II, were placed at the bottom of a river for three days. When retrieved from the river bottom they were covered with sand. Two plates were rinsed before testing and two were untouched. The results of the adhesion test were about the same in both cases and did not differ significantly from those of corresponding tests which did not include exposure in the river.

EXAMPLE IV

A large scale field test was carried out on the south wall of the Poe Lock at Sault Ste. Marie, Mich. The coating consisted of the block co-polymer and silicone oil as in Sample 3 of Example II. A solution was formed containing 11 percent of the above mixture in a solvent consisting of 89 percent toluene.

The coating was applied to a 176×9-ft. section of the wall. Depending on lock operating procedures, an ice collar would normally form within this 9-ft. range. Within this test section, the polymer coating was applied under three distinct conditions. The first 22 ft. of wall had been treated two years previously with epoxy paint (530A Cololine Primer and 709A Cololine Topcoat) manufactured by the Cielcote Company of Berea, Ohio. This area and the next 66 ft. of untreated concrete were first steamcleaned and then dried with high-pressure air. Unlike the laboratory test surfaces, the surface encountered in the field was rough, porous and covered with both organic and inorganic deposits. The remainder of the test section was cleaned only by the high-pressure air which removed little more than loose scale and organic growths.

Three layers of the polymer were than applied at a rate of 5.8 m$^2$/l for each layer by using an airless spray gun. This resulted in a coating about 0.13 mm thick. It was not possible to keep the concrete surface completely dry when the polymer was being applied since the porous concrete retained some moisture, and cracks within or between the concrete monoliths allowed water to seep onto the working surface. In addition, there was intermittent periods of light rain during application, and the test section was submerged when the lock needed to be operated only 6 hours after completion of the coating application.

The effectiveness of the wall coating was demonstrated by the ease with which the ice collar could be removed. Ice formation was not prevented, but removal even by heating, was significantly facilitated. Steam spreader bars placed on the ice collar on an uncoated section required from 4 to 6 hours to remove ice equal in length to the bar. On the coated wall, a section equal to the steam spreader bar length plus an additional 20 ft. of ice collar was removed in less than ½ hour. Mechanical action of a coal saw, when working in the coated section, caused 24 ft. of the ice collar to fall off. No ice fell off in the area that was not steam-cleaned. The ice that fell off using the steam spreader was in the area that was steam-cleaned but contained no epoxy undercoating. The area where the saw operated contained the epoxy plus the block co-polymer coating.

It is apparent that in accordance with the invention an ice release coating has been provided that is useful even in the severe in situ conditions of navigation locks. While the invention has been described in relationship to a specific use, it is clear that it can be useful in other environments subject to icing conditions.

We claim:

1. A method of reducing the adhesion of ice to a surface exposed to icing conditions comprising coating said surface with a block co-polymer of polycarbonate and dialkylsiloxane.

2. The method of claim 1 wherein the surface is a concrete surface.

3. The method of claim 1 wherein the coating is from about 0.10 to about 0.13 mm thick.

4. The method of claim 1 wherein the polycarbonate is derived from bisphenol A.

5. The method of claim 1 wherein the polycarbonate is a reaction product of bisphenol A and phosgene.

6. The method of claim 1 wherein the polycarbonate comprises a reaction product of bisphenol A and phosgene, and the dialkylsiloxane is dimethylsiloxane.

7. A method of reducing the adhesion of ice to a substantially vertical concrete surface comprising coating said surface with a block co-polymer of a polycarbonate derived from bisphenol A and dimethylsiloxane, said block copolymer containing a silicone oil.

8. The method of claim 7 wherein said silicone oil is present in the amount of 9 to 11 percent by weight of the block copolymer.

9. The method of claim 8 wherein the block co-polymer comprises 34 to 36 percent by weight of polycarbonate.

10. The method of claim 1 wherein the block copolymer contains blocks of dimethylsiloxane 19 to 21 units long.

11. The method of claim 1 wherein the block copolymer comprises 34 to 36 percent by weight of polycarbonate and the blocks of dialkylsiloxane are blocks of dimethylsiloxane 19 to 21 units long.

* * * * *